United States Patent
Marr et al.

(10) Patent No.: US 10,270,488 B2
(45) Date of Patent: Apr. 23, 2019

(54) BINARY HIGH-POWER MODULATOR

(71) Applicant: Raytheon Company, Waltham, MA (US)

(72) Inventors: Harry B. Marr, Manhattan Beach, CA (US); Victor S. Reinhardt, Rancho Palos Verdes, CA (US); John P. Gianvittorio, Venice, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/382,517

(22) Filed: Dec. 16, 2016

(65) Prior Publication Data

US 2018/0175907 A1 Jun. 21, 2018

(51) Int. Cl.
| | |
|---|---|
| H04B 1/04 | (2006.01) |
| H04B 1/7176 | (2011.01) |
| H04B 1/717 | (2011.01) |
| H04B 1/719 | (2011.01) |
| H04L 27/20 | (2006.01) |
| H04B 1/707 | (2011.01) |
| G01S 13/84 | (2006.01) |

(52) U.S. Cl.
CPC ......... *H04B 1/7176* (2013.01); *H04B 1/0475* (2013.01); *H04B 1/707* (2013.01); *H04B 1/717* (2013.01); *H04B 1/719* (2013.01); *H04L 27/2032* (2013.01); *G01S 13/84* (2013.01); *H04B 2001/0408* (2013.01)

(58) Field of Classification Search
USPC .................... 375/130, 148; 455/296, 326
See application file for complete search history.

(56) References Cited

U.S. PATENT DOCUMENTS

| | | | |
|---|---|---|---|
| 4,560,945 A * | 12/1985 | Olver | H03F 1/3229 327/100 |
| 5,499,265 A | 3/1996 | Dixon et al. | |
| 5,867,071 A * | 2/1999 | Chethik | H04L 27/362 332/103 |
| 6,075,812 A | 6/2000 | Cafarella et al. | |
| 6,150,921 A | 11/2000 | Werb et al. | |
| 6,812,524 B2 * | 11/2004 | Ahlers | H01L 29/0634 257/341 |
| 6,812,824 B1 | 11/2004 | Goldinger et al. | |
| 7,505,435 B2 | 3/2009 | Wittwer et al. | |

(Continued)

FOREIGN PATENT DOCUMENTS

EP   2 482 479 A1   6/2018

OTHER PUBLICATIONS

Dixon, "Spread Spectrum Systems With Commercial Applications, 3rd Ed.", John Wiley & Sons, Inc., Jan. 1, 1994 (pp. 18-31).

(Continued)

*Primary Examiner* — Eva Y Puente
(74) *Attorney, Agent, or Firm* — Lewis Roca Rothgerber Christie LLP

(57) ABSTRACT

System and method for signal modulation. In one embodiment, a circuit includes a channel for carrying an analog RF signal, a phase offset circuit on the channel, and configured to receive a phase code for modifying the analog RF signal to produce a modified RF signal, and a feedforward cancellation path coupled in parallel to the phase offset circuit for canceling a portion of the modified analog signal.

19 Claims, 2 Drawing Sheets

(56) References Cited

U.S. PATENT DOCUMENTS

| | | | | |
|---|---|---|---|---|
| 8,103,178 | B2* | 1/2012 | McKinney | H04B 10/2507 398/202 |
| 2002/0102958 | A1* | 8/2002 | Buer | H03D 9/0608 455/296 |
| 2004/0092245 | A1* | 5/2004 | Katz | H03D 9/0633 455/326 |
| 2004/0146014 | A1* | 7/2004 | Hammons, Jr. | H04L 1/0059 370/320 |
| 2006/0262835 | A1* | 11/2006 | Schmid | H04B 1/707 375/148 |
| 2009/0299188 | A1* | 12/2009 | Kunita | A61B 8/488 600/453 |
| 2010/0183294 | A1* | 7/2010 | Villarruel | H04B 10/032 398/10 |
| 2010/0284440 | A1 | 11/2010 | Betz et al. | |
| 2011/0102262 | A1* | 5/2011 | Haskell | H01Q 1/246 342/372 |
| 2014/0241463 | A1* | 8/2014 | Leenaerts | H04B 7/0617 375/299 |
| 2016/0365629 | A1* | 12/2016 | Yao | H01Q 1/1257 |
| 2017/0104617 | A1* | 4/2017 | Magers | H03C 3/40 |
| 2017/0180171 | A1* | 6/2017 | Hosseini | H04L 27/14 |
| 2017/0201224 | A1* | 7/2017 | Strong | H03H 7/20 |

OTHER PUBLICATIONS

Invitation to Pay Additional Fees for corresponding to International Application No. PCT/US2017/056623, filed Oct. 13, 2017, Invitation to Pay Additional Fees dated Feb. 23, 2018 (6 pgs.).

Avitabile, et al., Phase-shifter based on DDS-driven offset-PLL, Electronics Letters, Dec. 7, 2006 vol. 42 No. 25, two (2) sheets.

Jiaguo, et al., Active Phased Array Antenna Based on DDS, East China Research Institute of Electronic Engineering (ECRiEE), © 2003, pp. 511-516.

International Search Report for corresponding International Application No. PCT/US2017/056623, filed Oct. 13, 2017, International Search Report dated Jun. 4, 2018 and dated Jun. 19, 2018 (7 pgs.).

Written Opinion of the International Searching Authority for corresponding International Application No. PCT/US2017/056623, filed Oct. 13, 2017, Written Opinion of the International Searching Authority dated Jun. 19, 2018 (9 pgs.).

\* cited by examiner

BINARY HIGH-POWER MODULATOR

FIELD

The disclosed invention relates generally to electronic circuits, and to antenna communication, and relates more specifically to a system and method for spread spectrum modulation at radio frequency.

BACKGROUND

A typical RF system includes a relatively powerful transmitter and a sensitive receiver both connected to the same antenna. Occasionally, multiple unrelated antenna systems may be within range of each other, and may be operating within the same frequency spectrum. Accordingly, interference may result from various different signals being produced within the same band.

However, signals can be modulated by applying a code to a signal in its digital form such that certain bits of the digital signal are switched from 0 to 1 or from 1 to 0. That is, a binary signal can be modulated by a binary code, with the modulated digital signal thereafter being converted to an analog signal for transmission. For example, spread spectrum orthogonal coding has been done at baseband analog and baseband digital, but has not yet been attempted at RF, and has not been attempted after the amplifier change on a transmit channel, as the module should be able to handle very high power corresponding to a high-power signal.

Thus, this application describes an antenna system that provides spread spectrum orthogonal coding at the RF level.

SUMMARY

Some embodiments of the disclosed invention provide hardware that is able to mitigate in-band interference signals, that is able to apply orthogonal codes on communications signals prior to the low-noise amplifier (LNA) on a receiver, that is also able to apply the orthogonal codes after the power amplifier (PA) on the transmitter, and that is able to achieve signal communication with low loss.

In some embodiments, the disclosed invention is a circuit for signal modulation. The circuit includes: a channel for carrying an analog RF signal; a phase offset circuit on the channel, and configured to receive a phase code for modifying the analog RF signal to produce a modified RF signal; and a feedforward cancellation path coupled in parallel to the phase offset circuit for canceling a portion of the modified analog signal.

In one embodiment, the analog RF signal may include an encoded RF signal that is encoded according to the phase code, the circuit may further include a synchronization path for time-aligning the phase code received by the phase offset circuit to properly decode the encoded RF signal according to the phase code, and the phase code may be a binary offset code.

In one embodiment, the circuit may further include a power amplifier for amplifying the analog RF signal, and a bandpass filter for filtering frequencies of the modified RF signal, wherein the phase offset circuit, wherein the phase offset circuit is configured to receive the analog RF signal from the power amplifier.

In one embodiment, the phase offset circuit may be configured to modify the analog RF signal using differential modulation.

In some embodiments, the disclosed invention is an antenna system. The antenna system includes: a first 180-degree hybrid on a transmit channel for receiving a first RF signal, and for receiving a phase code for spreading the RF signal from a reject band into a spread band to produce an encoded RF signal; an antenna for transmitting the encoded RF signal, and for receiving a second RF signal; and a second 180-degree hybrid on a receive channel for receiving the second RF signal, and for receiving the phase code for despreading the second RF signal from the spread band into the reject band to produce a decoded RF signal.

In one embodiment, the antenna system may further include a digital-to-analog converter for receiving a digital signal, and for producing an analog signal; and a power amplifier for receiving the analog signal, and for producing the first RF signal.

In one embodiment, the antenna system may further include a bandpass filter on the transmit channel for receiving the first RF signal, for filtering frequencies of the first RF signal outside of the reject band to produce a filtered RF signal, and for transmitting the filtered RF signal to the first 180-degree hybrid as the first RF signal.

In one embodiment, the antenna system may further include a bandpass filter on the transmit channel for receiving the encoded RF signal, for filtering frequencies of the encoded RF outside of the spread band to produce a filtered encoded RF signal, and transmitting the filtered encoded RF signal to the antenna as the encoded RF signal.

In one embodiment, the antenna system may further include a bandpass filter on the receive channel for receiving the decoded RF signal, and for filtering frequencies of the decoded RF signal outside of the reject band to produce a filtered decoded RF signal.

In one embodiment, the antenna system may further include a low-noise amplifier for receiving the filtered decoded RF signal, and for amplifying the filtered decoded RF signal to produce an amplified decoded RF signal; and an analog-to-digital converter for receiving the amplified decoded RF signal, and for converting the amplified decoded RF signal to a digital signal for analysis.

In one embodiment, the antenna system may further include a digital logic between the receive channel and the transmit channel for time-aligning the phase code applied to the second 180-degree hybrid with the second RF signal that is encoded with the phase code.

In some embodiments, the disclosed invention is a method of RF signal processing. The method includes: receiving an RF signal at a phase offset circuit; receiving a phase code at the phase offset circuit; phase-shifting portions of the RF signal according to the phase code to generate a phase-shifted RF signal; and transmitting the phase-shifted RF signal.

In one embodiment, the method may further include: generating a digital signal; converting the digital signal to an analog signal; amplifying the analog signal to generate an amplified analog signal; and filtering the amplified analog signal to generate the RF signal.

In one embodiment, the method may further include filtering the phase-shifted RF signal to generate a filtered phase-shifted signal.

In one embodiment, the method may further include using an antenna to transmit the filtered phase-shifted signal.

In one embodiment, the method may further include receiving the RF signal from an antenna, wherein the RF signal is encoded according to the phase code.

In one embodiment, the method may further include cancelling a portion of the phase-shifted RF signal using a feedforward cancellation path coupled in parallel to the phase offset circuit, the phase offset circuit may be a 180-degree hybrid, and the phase code may be a binary offset code.

In one embodiment, phase-shifting portions of the RF signal according to the phase code to generate a phase-shifted RF signal may include spreading the RF signal from a reject band to a spread band.

In one embodiment, the phase-shifting portions of the RF signal according to the phase code to generate a phase-shifted RF signal may include despreading the RF signal from a spread band to a reject band.

In one embodiment, the method may further include: using feedback to perform synchronization of a receive code as the phase code with a transmit code used to encode the RF signal; and decoding the RF signal.

Accordingly, the method and system of embodiments of the present invention are able to encode and decode signals at the RF level, without modifying pre-existing digital encoding/decoding during signal transmission/reception.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

In some embodiments, the disclosed invention provides a novel circuit to mitigate in-band interferers through signal modulation. The circuit may include a bi-phase modulator circuit to spread and despread signals, a device to generate a spreading code to send to the signal modulator, and a device to detect the start sequence to a received code.

In some embodiments, the bi-phase modulator uses a 180-degree hybrid (e.g., a signal spreader) to phase-shift selected portions of a signal 180 degrees while leaving other portions of the signal unshifted, where the selected portions are determined according to the spreading code as a binary offset code. It should be noted that, although a 180-degree hybrid is mainly described below, a different phase offset circuit may be used in other embodiments of the present invention (e.g., a 90-degree phase offset circuit). Further, although a binary offset code is mainly referenced below, other types of phase code may be used in other embodiments of the present invention.

Figure 1:
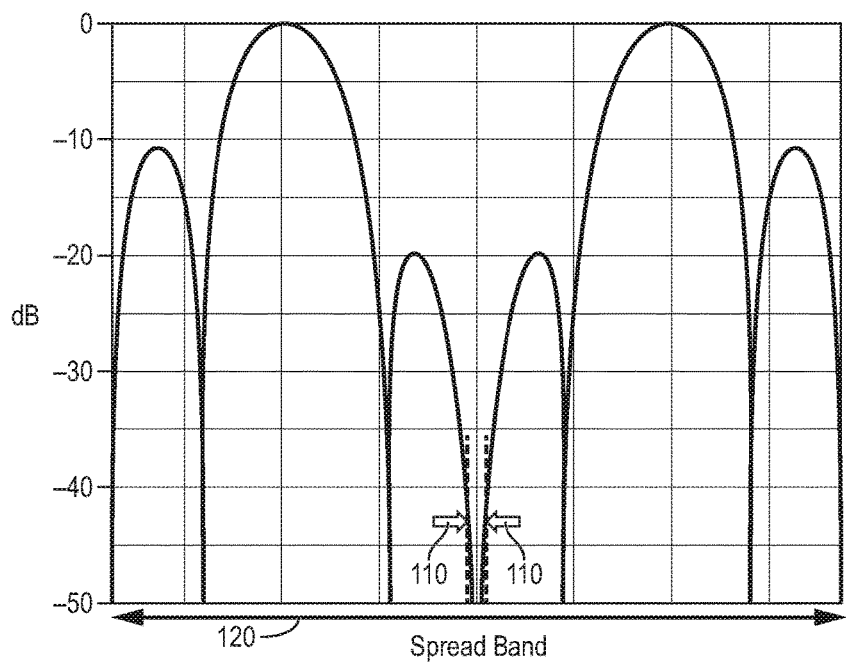
FIG. 1 is a spectrum resulting from a spread Binary Offset Code (BOC) at RF, according to an embodiment of the present invention.

FIG. 1 is a spectrum resulting from a Binary Offset Code (BOC) at RF, according to an embodiment of the present invention. Measurements corresponding to the information included in FIG. 1 are as follows: 65% BOC_mainpwr_2_1; rejband=3.0400; pwrimplossdB=−0.9180; pwrrejdB=−134.2354; COTSband=0.1476; spreadBW=150; coderate=18.7500; and subcarrier rate=37.5. The pwrrejdB parameter gives the rejected power shown in the middle of the plot shown by the TX COTS Reject Band in the figure where the signal is rejected up to 134 dB down from the level at the input to the circuit at that frequency. FIG. 1 shows an example simulation where the signal is at 65% of total power, the rejection band is 3.04 MHz, the input power loss is modeled at −0.9 dB, and the bandwidth over which a COTS part can be obtained to achieve similar rejection is 0.14 MHz. The spreadBW parameter gives the spread bandwidth or the bandwidth over which the spreading code can operate in this particular embodiment, 150 MHz in this case. The code rate is the rate at which symbols are transmitted in the binary offset code, 18.75 ksps, the subcarrier rate is 37.5 MHz.

Referring to FIG. 1, a system of an embodiment of the present invention modulates a signal inside an interference mitigation band, or inside a reject band (e.g., 50 dB Tx "commercial off the shelf" (COTS) reject band) 110, to cause the portion of the signal that is inside the reject band 110 to be spread into an adjacent spread band 120. That is, the system of the present embodiment may perform spread spectrum modulation at the RF level on information corresponding to the frequencies of the signal carrying the information. For example, the system may modulate frequencies contained within the narrow reject band 110, and may spread the information over the spread band 120, such that the information is modulated to be within frequencies within the spread band 120 but falling outside of the reject band 110, while also reducing the power across the spread band 120. The system may similarly modulate frequencies contained within the spread band 120 and located outside of the reject band 110 such that the information is despread to be carried on frequencies located within the reject band 110.

The present example of the BOC used by the system of the present embodiment is a binary modulation signal. The system applies the BOC to an RF signal that is to be transmitted by the system to thereby encode the RF signal, or applies the BOC to an RF signal that is received by the system to thereby decode the RF signal. In the example shown in FIG. 1, the BOC is a simple cosine BOC that is used to spread the frequencies of an RF transmission by a standard, or COTS, transmitter.

Figure 2:
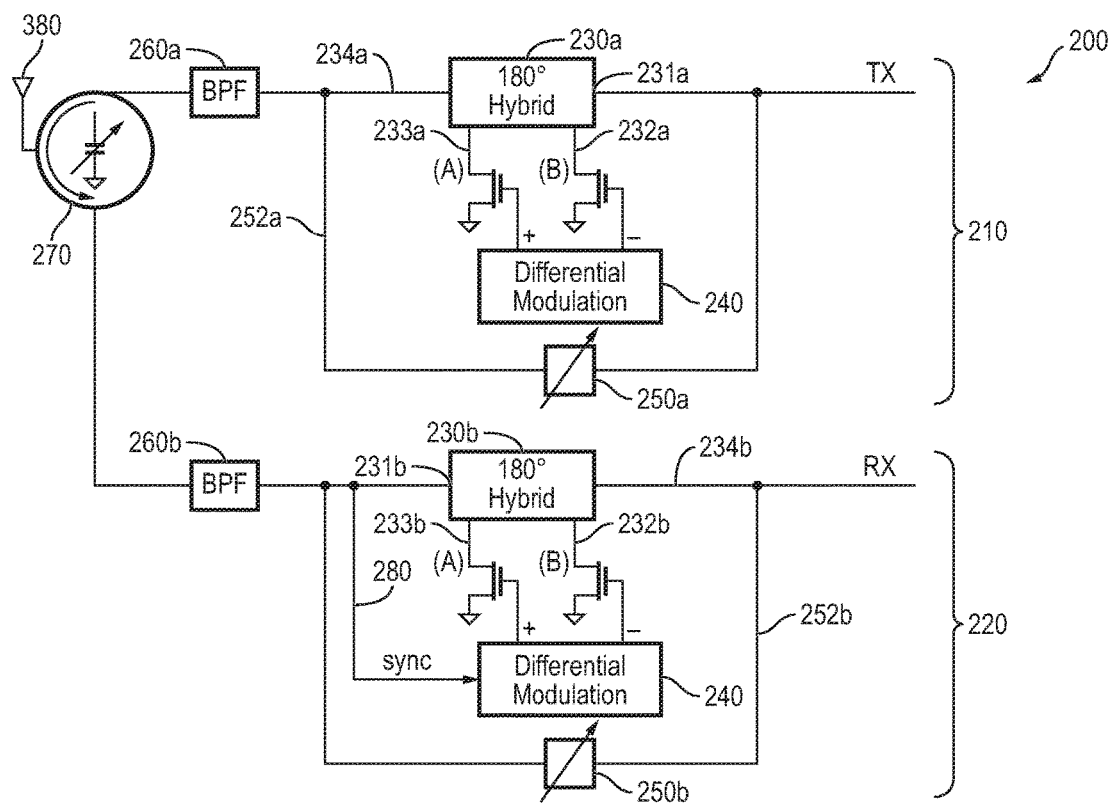
FIG. 2 is a block diagram of a circuit of a binary high-power modulator according to an embodiment of the present invention.

FIG. 2 is a block diagram of a circuit of a binary high-power modulator according to an embodiment of the present invention.

As described above, spread spectrum orthogonal coding has previously been performed at baseband analog and at baseband digital. However, a circuit for modulating signals using spread spectrum orthogonal coding using a phase offset circuit (e.g., a 180-degree hybrid) to phase shift portions of the signal at the RF level has not been previously accomplished.

Figure 3:
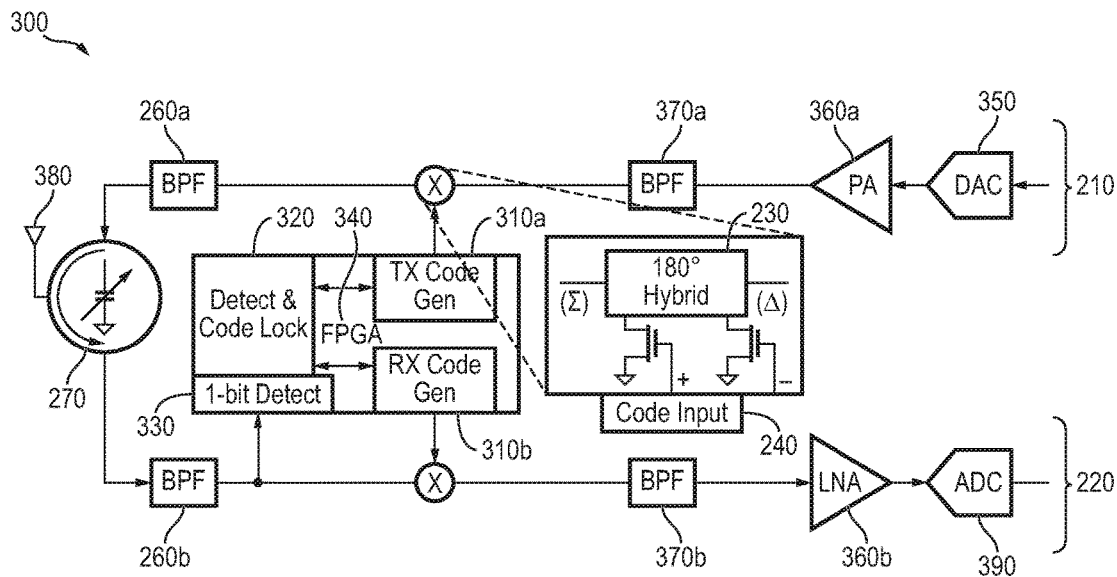
FIG. 3 is a block diagram of an antenna system implementing the circuit shown in FIG. 2, according to an embodiment of the present invention.

Referring to FIG. 2, during transmission of an RF signal, the circuit 200 of the present embodiment operates when the RF signal reaches a 180-degree hybrid 230a of a transmit TX channel/path 210 (e.g., a transmit channel 210 of an antenna system 300, as shown in FIG. 3).

The 180-degree hybrid 230 is a four-port device, and is configured to receive the RF signal (e.g., the RF signal carrying the information to be transmitted, or a received RF signal carrying information to be analyzed) at its input 231. The 180-degree hybrid 230 is also configured to receive a modulation signal (e.g., the BOC) for modulating (e.g., encoding or decoding) the RF signal by performing a 180-degree phase shift on portions of the RF signal. In the present embodiment, the BOC modulation signal is applied to two ports 232 and 233 of the 180-degree hybrid 230 using differential modulation 240. Based on the BOC modulation signal the 180-degree hybrid 230 selectively performs a 180-degree phase shift on portions of the RF signal (e.g., on some of the frequencies of the RF signal), the RF signal being received by the 180-degree hybrid 230 at the input 231.

Accordingly, the BOC modulation signal for encoding an RF signal to be transmitted is applied to two of the ports 232a and 233a of the 180-degree hybrid 210a on the transmit channel 210 to determine which portions of the RF signal received at the input 231a of the 180-degree hybrid 210a are phase-shifted by the 180-degree hybrid 230a. That is, the 180-degree hybrid 230a applies the BOC to the analog RF signal by using differential modulation 240 to generate a modified/phase-shifted RF signal at an output 234a of the 180-degree hybrid 230a.

The RF signal received by the 180-degree hybrid 230a on the transmit channel also travels to a feedforward cancellation path (e.g., an RF signal equalization path) 250a. The feedforward cancellation path 250a additionally conditions the RF signal on the transmit channel 210 by performing additional RF cancellation of portions of the RF signal.

For example, although the 180-degree hybrid 230a on the transmit channel 210 spreads out most of the RF signal into the spread band 120 by phase-shifting portions of the RF signal (e.g., frequencies of the RF signal located in the reject band 110), some residual portions of the RF signal may still remain in a center of the reject band 110 (see FIG. 1). Accordingly, the feedforward cancellation path 250a effectively applies a cancellation signal to provide deconstructive interference at the output 234a of the 180-degree-hybrid 230a to an unspread portion of the RF signal (e.g., a portion of the RF signal that is unmodified, or that is not phase-shifted, by the 180-degree hybrid 230a). The interference provided by the feedforward cancellation path 250a effectively cancels or reduces that portion of the RF signal to be transmitted. The feedforward cancellation path 250a may achieve this by applying a proper time delay of the RF signal, such that when the signal transmitted by the feedforward cancellation path 250a recombines with the phase-shifted RF signal produced by the 180-degree hybrid 230a, the portions of signals that recombine at a node connecting the output 234a of the 180-degree hybrid 230a and an output 252a of the feedforward cancellation path 250a are 180 degrees out of phase, thereby canceling each other out. The feedforward cancellation path 250a, however, should not affect any portion of the phase-shifted RF signal that has been spread from the reject band 110 into the spread band 120 by the 180-degree hybrid 230a.

The combined signal produced by the 180-degree hybrid 230a and the feedforward cancellation path 250a (e.g., a phase-shifted and partly canceled RF signal) is then passed to a bandpass filter (BPF) 260a for further signal processing. The BPF 260a allows the system to apply a filter to dampen, or filter, frequencies of the modified RF signal that are located outside of the spread band 120 (e.g., to filter frequencies of the modified RF signal that are neither within the spread band 120 nor within the reject band 110) to thereby produce a filtered phase-shifted signal. Thereafter, the filtered signal is passed to a circulator 270 to eventually be transmitted by an antenna (e.g., antenna 380 of the antenna system 300 of FIG. 3). In embodiments of the present invention, the circulator 270, which is a non-reciprocal three-port device, may be a distributedly modulated capacitor, although the present embodiment is not limited thereto.

Similarly, when an RF signal is received on a receive RX channel/path 220 of the circuit 200, a similar process occurs, albeit somewhat in reverse. For example, the RF signal is received at the receive channel 220 from the circulator 270, and a BPF 260b filters frequencies of the RF signal that are outside of the spread band 120 to create a filtered RF signal, thereby improving quality of signal analysis.

Thereafter, a 180-degree hybrid 230b on the receive channel 220 receives the filtered RF signal at its input 231b from the BPF 260b. The 180-degree hybrid 230b applies the same BOC used by the 180-degree hybrid 230a on the transmit channel 210 by using differential modulation 240 to despread (e.g., decode) the filtered RF signal. That is, the 180-degree hybrid 230b on the receive channel 220 performs 180-degree phase-shifting on portions of the filtered RF signal to move the information from the spread band 120 into the reject band 110, thereby producing a modulated, phase-shifted RF signal.

When modulating the received RF signal, which carries the information to be analyzed, the RF signal received by the 180-degree hybrid 230b should be time-aligned with the signal carrying the BOC, which is received at inputs 232b and 233b of the 180-degree hybrid 230b. To ensure that the BOC applied by the 180-degree hybrid 230b of the receive channel 220 (e.g., a receive code) is time-aligned with the BOC applied to the 180-degree hybrid 230a of the transmit channel 210 (e.g., a transmit code), the receive channel 220 includes a synchronization path/synchronization device 280. Accordingly, by peeling the code off of the received signal itself (e.g., the filtered signal passed along by the BPF 260b), the architecture of the circuit 200 of the present embodiment is able to automatically perform self-synchronization by using feedback, thereby enabling the circuit 200 to ensure that the portions of the received signal that are despread from the spread band 120 into the reject band 110 correspond to the portions of the transmitted signal that are spread from the reject band 110 into the spread band 120.

A feedforward path 250b on the receive channel 220 produces a signal at its output 252b that combines with the despread, phase-shifted RF signal produced by the 180-degree hybrid 230b at the output 234b of the 180-degree hybrid 230b to cancel remaining portions of the phase-shifted RF signal that remain in the spread band 120. Thereafter, the resultant signal may be analyzed by the system.

FIG. 3 is a block diagram of an antenna system implementing the circuit shown in FIG. 2, according to an embodiment of the present invention.

Referring to FIG. 3, in the antenna system 300 of the present embodiment, functioning of the 180-degree hybrids 230 and the feedforward paths 250 shown in FIG. 2 are respectively further enabled by a transmit (TX) code generator 310a and a receive (RX) code generator 310b, which are respectively connected to a corresponding one of the 180-degree hybrids 230. Both of the TX code generator 310a and the RX code generator 310b are in communication with a detect and code lock 320 and a 1-bit detect (e.g., a device for 1-bit error detection) 330 to time-align the RX code (e.g., the despreading BOC) applied to the received RF signal with the TX code (e.g., the spreading BOC) applied to the transmitted RF signal. Code detection and locking is known in the art, such as U.S. Pat. No. 5,420,593 A, "Method and apparatus for accelerating code correlation searches in initial acquisition and doppler and code phase in re-acquisition of GPS satellite signals". A technique often used to achieve "code" lock is to digitally sample the signal and perform a correlation function to the incoming code. The time at which the correlation function peaks gives the time at which the detector is aligned to the incoming signal.

A 1-bit digitizer can be used in some embodiments of the invention to reduce the size, weight, and power (SWAP) of the detector.

The detect and code lock 320 and the 1-bit detect 330 may be implemented as a digital logic, and may be used for time-aligning the BOC used to decode the received signal with the BOC used to encode the signal before its transmission. Additionally, as can be seen in FIG. 3, the TX code generator 310a, the RX code generator 310b, the 1-bit detect 330, and the detect and code lock 320 may all be part of the same field-programmable gate array (FPGA) 340, although other embodiments of the present invention are not limited thereto.

In the present embodiment, the TX code and the RX code both correspond to a continuous binary code (e.g., the BOC) streamed to the 180-degree hybrid 230, as described with respect to FIG. 2. To ensure that the 180-degree hybrids 230 perform a 180-degree phase shift on appropriate portions of the RF signal being transmitted or received by the antenna system 300, synchronization of the modulation code (e.g., the BOC that causes spreading or despreading of the RF signal) between the receive channel 220 and the transmit channel 210 is achieved by communication of the code generators 310 with the detect and code lock 320 and the 1-bit detect 330. Accordingly, two entities that each use a corresponding version of the system 300 of the present embodiment to communicate with each other can ensure that the system 300 receiving the RF signal that was previously encoded and spread into the spread band 120 due to the BOC can properly and accurately despread/decode the received RF signal back into the reject band 110 for signal analysis.

In the present embodiment, it should be noted that the described RF signals may correspond to communication signals, or may instead correspond to radar signals. In a process of transmitting a signal via the transmit channel 210, a digital signal, which corresponds to the RF signal to be transmitted, is passed through a digital-to-analog converter 350 to produce an analog RF signal. The analog RF signal is then amplified by a power amplifier (PA) 360a to produce an amplified analog signal.

The amplified analog signal is then passed through a bandpass filter (BPF) 370a to produce a filtered and amplified analog signal. The BPF 370a filters out frequencies of the RF signal that fall outside of the reject band 110 (see FIG. 1). That is, the BPF 370a isolates the portion of the RF signal that is to be spread by the circuit 200 (see FIG. 2). Accordingly, when the BOC is applied to, the portion of the RF signal that is located in the reject band 110 to thereby spread the RF signal into the spread band 120, preexisting signal frequencies (e.g., noise) located in the spread band 120 will not interfere with the intended spread signal, as they will have been filtered out by the BPF 370a.

Once the filtered, amplified analog signal is delivered to the 180-degree hybrid 230a, the BOC is used to encode the signal to create an encoded/spread signal. Furthermore, as described with respect to FIG. 2, a feedforward cancellation path 250a may be used to further condition the encoded signal by cancelling portions of the signal that remain in the reject band 110. The encoded signal is then passed through the BPF 260a, which was previously described with respect to FIG. 2, to filter out frequencies of the signal that fall outside of the spread band 120 (e.g., outside of the spread band 120 and the reject band 110). That is, some amount of noise or interference may be introduced by differential modulation 240 performed by the 180-degree hybrid 230 to encode the signal. Accordingly, using the BPF 260a to filter the signal prior to transmission by the antenna 380 improves quality of the transmitted signal.

After being filtered by the BPF 260a, the filtered, phase-shifted signal is passed along to the circulator 270, and then to the antenna 380 for transmission. The circulator 270 is able to prevent the high-powered RF signal to be transmitted from the antenna 380 from entering the receive channel 220. Additionally, although a single antenna 380 is described, it should be noted that an array of antennas may be used in other embodiments of the present invention.

The receive channel 220 of the antenna system 300 of the present embodiment is configured in a manner that mirrors the transmit channel 210. When the RF signal to be received and analyzed by the system 300 is received by the antenna 380, the RF signal is passed through the circulator 270 to the previously mentioned BPF 260b. The BPF 260b filters out frequencies of the received RF signal that fall outside of the spread band 120 (e.g., outside of the spread band 120 and the reject band 110) to produce a filtered signal.

The filtered signal is then received by the 180-degree hybrid 230b to be despread from the spread band 120 into the reject band 110. As described with respect to FIG. 2, the 180-degree hybrid 230b may be connected in parallel to the feedforward cancellation path 250b to improve signal quality by cancelling portions of the RF signal remaining in the spread band 120 after despreading/decoding.

The decoded RF signal may then be sent to another BPF 370b to further clean up the signal. A filtered signal is then passed from the BPF 370b to a low-noise amplifier (LNA) 360b to amplify the filtered signal. The LNA 360b then passes the amplified signal along to an analog-to-digital converter 390, such that the amplified RF signal can be converted into a digital signal to be digitally analyzed by the antenna system 300. Analysis of the digital signal may be performed in various manners.

Figure 4:
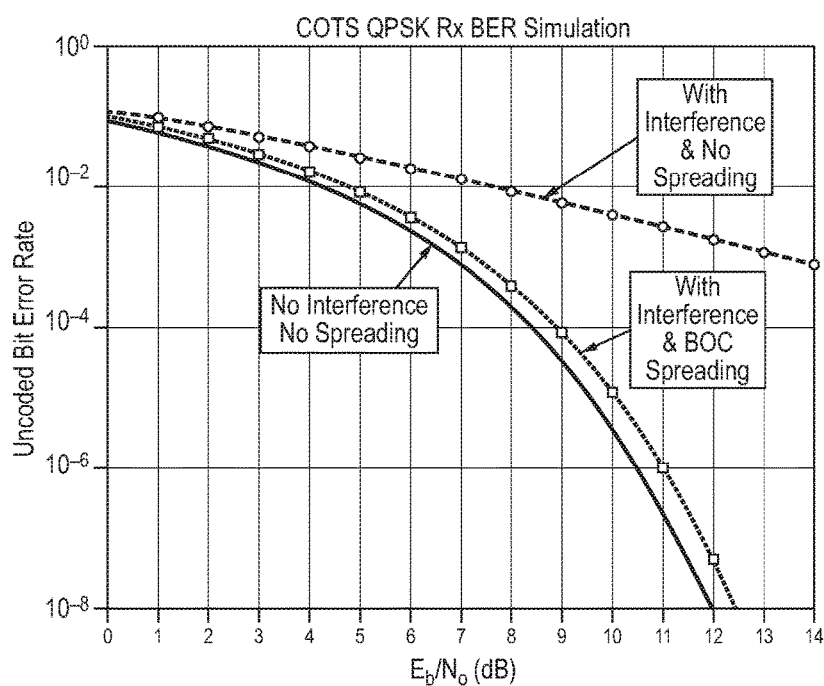
FIG. 4 is a graph depicting a simulation of system performance of an embodiment of the present invention, and depicting simulations of system performance of conventional systems.

FIG. 4 is a graph depicting a simulation of system performance of an embodiment of the present invention, and depicting simulations of system performance of conventional systems.

Referring to FIG. 4, an uncoded bit error rate as a function of signal-to-noise ratio (in decibels) is shown for an embodiment of the present invention, is shown for a system experiencing no interference and using no spreading code, and is shown for a system experiencing signal interference but using no spreading code.

As can be seen in FIG. 4, the system of the present embodiment is able to achieve recovery of a significant amount of bit error rate degradation when compared to the system that does not modulate the transmitted signals and that experiences signal interference.

Furthermore, identical antenna systems 300 of the present embodiment of the invention may effectively operate within close proximity of one another without signal interference by simply applying a different Binary Offset Code (BOC) to the different transmissions. By applying different BOCs to respective signals transmitted by respective systems, the different signals may exist within the same frequency band while being orthogonal to one another due to modulation by the different BOCs. Because the different signals are orthogonal to each other, the signals will not typically interfere with one another to a significant degree, thereby effectively increasing utility of a particular frequency spectrum.

Additionally, the system and method of embodiments of the disclosed invention are better than the conventional systems and methods because the RF signal is able to be encoded or decoded at the RF level using hardware, thereby reducing overhead associated with digital manipulation of the signals.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A circuit for signal modulation, the circuit comprising:
a channel for carrying an analog RF signal;
a phase offset circuit configured to receive the analog RF signal on the channel, and configured to receive a phase code comprising a binary offset code for modifying the analog RF signal to produce a modified RF signal; and
a feedforward cancellation path coupled in parallel to the phase offset circuit for canceling a portion of the modified RF signal.

2. The circuit of claim 1, wherein the analog RF signal comprises an encoded RF signal that is encoded according to the phase code, and
wherein the circuit further comprises a synchronization path for time-aligning the phase code received by the phase offset circuit to properly decode the encoded RF signal according to the phase code.

3. The circuit of claim 1, further comprising a power amplifier for amplifying the analog RF signal, and a bandpass filter for filtering frequencies of the modified RF signal, wherein the phase offset circuit is configured to receive the analog RE signal from the power amplifier.

4. The circuit of claim 1, wherein the phase offset circuit is configured to modify the analog RF signal using differential modulation.

5. An antenna system comprising:
a first 180-degree hybrid on a transmit channel for receiving a first RF signal, and for receiving a phase code comprising a binary offset code for spreading the first RF signal from a reject band into a spread band to produce an encoded RF signal;
an antenna for transmitting the encoded RF signal, and for receiving a second RF signal; and
a second 180-degree hybrid on a receive channel for receiving the second RF signal, and for receiving the phase code for despreading the second RF signal from the spread band into the reject band to produce a decoded RF signal.

6. The antenna system of claim 5, further comprising:
a digital-to-analog converter for receiving a digital signal, and for producing an analog signal; and
a power amplifier for receiving the analog signal, and for producing the first RF signal.

7. The antenna system of claim 6, further comprising a bandpass filter on the transmit channel for receiving the first RF signal, for filtering frequencies of the first RF signal outside of the reject band to produce a filtered RF signal, and for transmitting the filtered RF signal to the first 180-degree hybrid as the first RF signal.

8. The antenna system of claim 5, further comprising a bandpass filter on the transmit channel for receiving the encoded RF signal, for filtering frequencies of the encoded RF signal outside of the spread band to produce a filtered encoded RF signal, and for transmitting the filtered encoded RF signal to the antenna as the encoded RF signal.

9. The antenna system of claim 5, further comprising a bandpass filter on the receive channel for receiving the decoded RF signal, and for filtering frequencies of the decoded RF signal outside of the reject band to produce a filtered decoded RF signal.

10. The antenna system of claim 9, further comprising:
a low-noise amplifier for receiving the filtered decoded RF signal, and for amplifying the filtered decoded RF signal to produce an amplified decoded RF signal; and
an analog-to-digital converter for receiving the amplified decoded RF signal, and for converting the amplified decoded RF signal to a digital signal for analysis.

11. The antenna system of claim 5, further comprising a digital logic between the receive channel and the transmit channel for time-aligning the phase code applied to the second 180-degree hybrid with the second RF signal that is encoded with the phase code.

12. A method of RF signal processing, the method comprising:
receiving an RF signal at a phase offset circuit from an antenna;
receiving a phase code comprising a binary offset code at the phase offset circuit;
phase-shifting portions of the RF signal according to the phase code to generate a phase-shifted RF signal; and
transmitting the phase-shifted RF signal,
wherein the RF signal is encoded according to the phase code.

13. The method of claim 12, further comprising:
generating a digital signal;
converting the digital signal to an analog signal;
amplifying the analog signal to generate an amplified analog signal; and
filtering the amplified analog signal to generate the RF signal.

14. The method of claim 12, further comprising filtering the phase-shifted RF signal to generate a filtered phase-shifted signal.

15. The method of claim 14, further comprising using an antenna to transmit the filtered phase-shifted signal.

16. The method of claim 12, wherein phase-shifting portions of the RF signal according to the phase code to generate a phase-shifted RF signal comprises spreading the RF signal from a reject band to a spread band.

17. The method of claim 12, wherein the phase-shifting portions of the RF signal according to the phase code to generate a phase-shifted RF signal comprises despreading the RF signal from a spread band to a reject band.

18. The method of claim 12, further comprising:
using feedback to perform synchronization of a receive code as the phase code with a transmit code used to encode the RF signal; and
decoding the RF signal.

19. The method of claim 12, further comprising cancelling a portion of the phase-shifted RF signal using a feedforward cancellation path coupled in parallel to the phase offset circuit, wherein the phase offset circuit comprises a 180-degree hybrid.

* * * * *